United States Patent [19]
Dent

[11] Patent Number: 5,218,619
[45] Date of Patent: Jun. 8, 1993

[54] CDMA SUBTRACTIVE DEMODULATION

[75] Inventor: Paul W. Dent, Stehag, Sweden

[73] Assignee: Ericsson GE Mobile Communications Holding, Inc., Paramus, N.J.

[21] Appl. No.: 739,446

[22] Filed: Aug. 2, 1991

Related U.S. Application Data

[63] Continuation-in-part of Ser. No. 628,359, Dec. 17, 1990, Pat. No. 5,151,919.

[51] Int. Cl.$^5$ ............................................. H04K 1/00
[52] U.S. Cl. ...................................................... 375/1
[58] Field of Search ............................................. 375/1

[56] References Cited

U.S. PATENT DOCUMENTS 4,644,560 2/1987 Torre et al. .
4,901,307 2/1990 Gilhousen et al. .
4,930,140 5/1990 Cripps et al. .
4,984,247 1/1991 Kaufmann et al. .
5,022,049 6/1991 Abrahamson et al. .

OTHER PUBLICATIONS

"Very Low Rate Convolutional Codes for Maximum Teoretical Performance of Spread-Spectrum Multiple-Access Channels", Andrew J. Viterbi, IEEE Journal on Selected Areas in Communications, vol. 8, No. 4, May 1990, pp. 641-649.

Primary Examiner—David Cain
Attorney, Agent, or Firm—Burns, Doane, Swecker & Mathis

[57] ABSTRACT

Subtractive CDMA demodulation optimally decodes a coded information signal embedded in many other overlapping signals making up a received, composite signal. A radio receiver correlates a unique code corresponding to the desired signal to be decoded with the composite signal. Moreover, after each information signal is successfully decoded, it is recoded and removed from the composite signal. Subtractive CDMA demodulation is enhanced by decoding the composite signal in the order of strongest to weakest signal strength. The individual information signals are spread using block error correction codes which are correlated with the composite signal using Fast Walsh transforms. Correlated signals identified as the largest transform component are removed from the composite signal and the remaining composite signal is reformulated using an inverted Fast Walsh transform. Any residual error or interference caused during the extraction of a transform component is removed by recorrelating the composite signal using the index of that transform component.

40 Claims, 11 Drawing Sheets

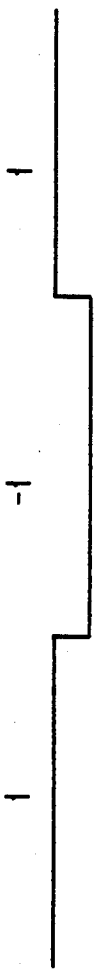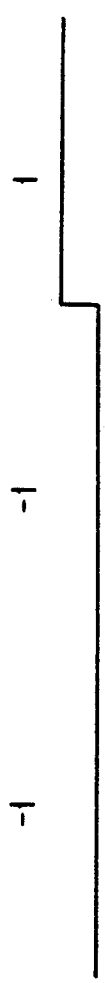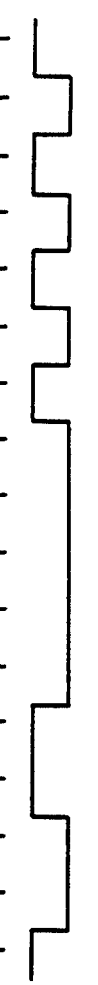
Fig. 2
(a) DATASTREAM FOR SIGNAL 1.
(b) CODE FOR SIGNAL 1.
(c) RESULT OF MULTIPLICATION.
(d) DATASTREAM FOR SIGNAL 2.
(e) CODE FOR SIGNAL 2.
(f) RESULT OF MULTIPLICATION.

(a) SUM OF THE TWO.

(b) CODE FOR SIGNAL 2.

(c) PRODUCT OF CODE 2 WITH THE SUM.

(d)

AVERAGE -0.67 DATA DECISION = -1

AVERAGE -1.33 DATA DECISION = -1

AVERAGE +0.80 DATA DECISION = +1

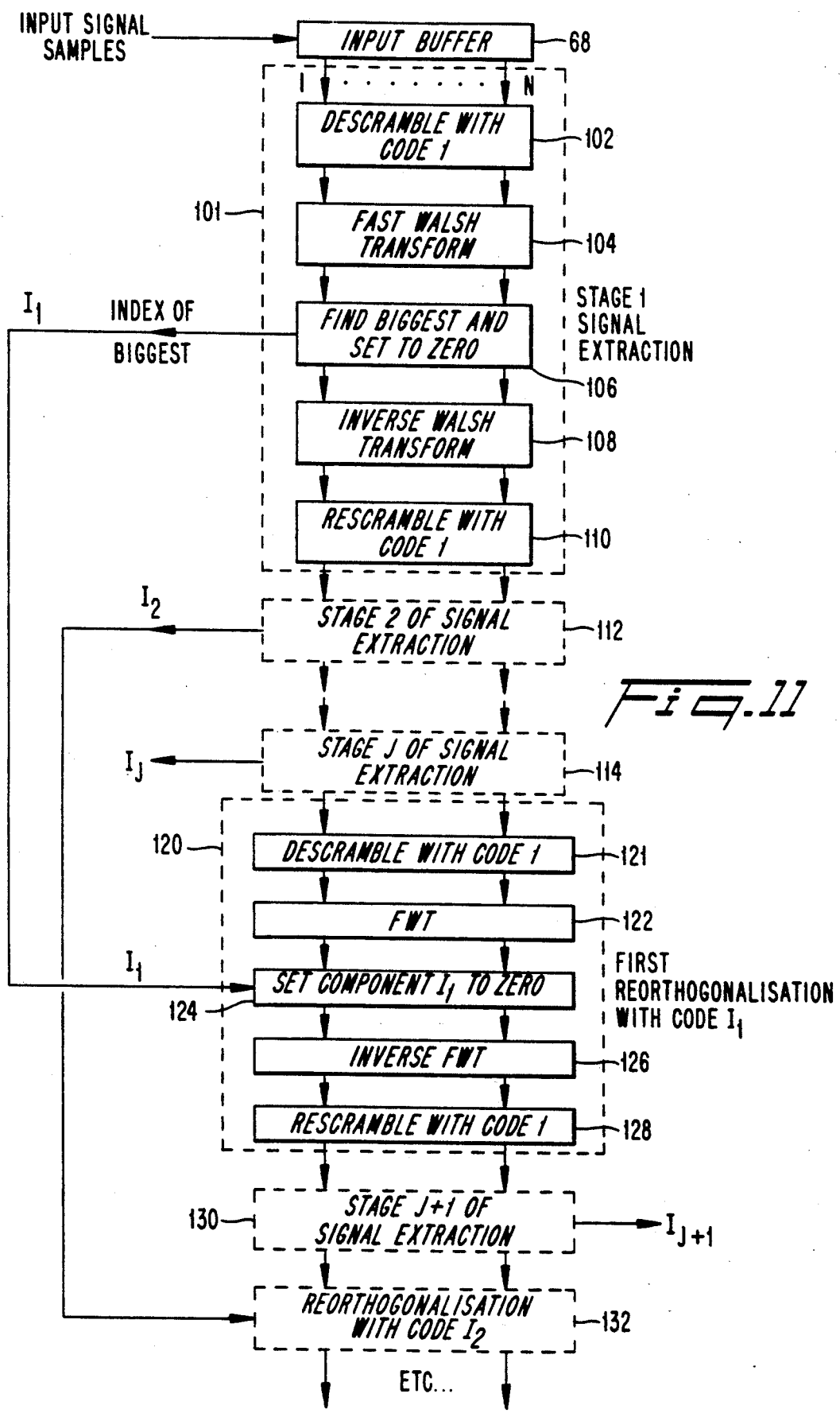

CDMA SUBTRACTIVE DEMODULATION

RELATED APPLICATIONS

This is a continuation-in-part of U.S. patent application Ser. No. 07/628,359, filed on Dec. 17, 1990, now U.S. Pat. No. 5,151,919, and assigned to the same assignee.

FIELD OF THE INVENTION

The present invention relates to the use of Code Division Multiple Access (CDMA) communications techniques in cellular radio telephone communication systems, and more particularly, to an enhanced CDMA demodulation scheme based on successive signal subtractions of multiple CDMA signals that compensates for residual interference introduced during the subtraction process.

BACKGROUND OF THE INVENTION

The cellular telephone industry has made phenomenal strides in commercial operations in the United States as well as the rest of the world. Growth in major metropolitan areas has far exceeded expectations and is outstripping system capacity. If this trend continues, the effects of rapid growth will soon reach even the smallest markets. Innovative solutions are required to meet these increasing capacity needs as well as maintain high quality service and avoid rising prices.

Throughout the world, one important step in cellular systems is to change from analog to digital transmission. Equally important is the choice of an effective digital transmission scheme for implementing the next generation of cellular technology. Furthermore, it is widely believed that the first generation of Personal Communication Networks (PCN), (employing low cost, pocket-size, cordless telephones that can be carried comfortably and used to make or receive calls in the home, office, street, car, etc.), would be provided by the cellular carriers using the next generation digital cellular system infrastructure and the cellular frequencies. The key feature demanded in these new system is increased traffic capacity.

Currently, channel access is achieved using Frequency Division Multiple Access (FDMA) and Time Division Multiple Access (TDMA) methods. As illustrated in FIG. 1(a), in FDMA, a communication channel is a single radio frequency band into which a signal's transmission power is concentrated. Interference with adjacent channels is limited by the use of band pass filters which only pass signal energy within the specified frequency band. Thus, with each channel being assigned a different frequency, system capacity is limited by the available frequencies as well as by limitations imposed by channel reuse.

In TDMA systems, as shown in FIG. 1(b), a channel consists of a time slot in a periodic train of time intervals over the same frequency. Each period of time slots is called a frame. A given signal's energy is confined to one of these time slots. Adjacent channel interference is limited by the use of a time gate or other synchronization element that only passes signal energy received at the proper time. Thus, the problem of interference from different relative signal strength levels is reduced.

Capacity in a TDMA system is increased by compressing the transmission signal into a shorter time slot. As a result, the information must be transmitted at a correspondingly faster burst rate which increases the amount of occupied spectrum proportionally.

With FDMA or TDMA systems or hybrid FDMA/TDMA systems, the goal is to insure that two potentially interfering signals do not occupy the same frequency at the same time. In contrast, Code Division Multiple Access (CDMA) allows signals to overlap in both time and frequency, as illustrated in FIG. 1(c). Thus, all CDMA signals share the same frequency spectrum. In either the frequency or the time domain, the multiple access signals appear to be on top of each other.

In principal, the source informational data stream, e.g., speech, to be transmitted is impressed upon a much higher bit rate data stream generated by a pseudorandom code generator. This combination of the higher bit rate coding signal with the lower bit rate data information stream is called coding or spreading the informational data stream signal. Each informational data stream or channel is allocated a unique spreading code. A plurality of coded information signals are modulated and transmitted on a radio frequency carrier wave. A composite signal of multiple coded signals is received at a receiver. Each of the coded signals overlaps all of the other coded signals, as well as noise-related signals, in both frequency and time. The composite signal is demodulated and correlated with a selected spreading code. Correlation by code isolates and decodes the corresponding error-coded signal.

There are a number of advantages associated with CDMA communication techniques. The capacity limits of CDMA-based cellular systems are projected to be up to twenty times that of existing analog technology as a result of the properties of a wide band CDMA system, such as improved coding gain/modulation density, voice activity gating, sectorization and reuse of the same spectrum in every cell. CDMA is virtually immune to multi-path interference, and eliminates fading and static to enhance performance in urban areas. CDMA transmission of voice by a high bit rate decoder insures superior, realistic voice quality. CDMA also provides for variable data rates allowing many different grades of voice quality to be offered. The scrambled signal format of CDMA completely eliminates cross talk and makes it very difficult and costly to eavesdrop or track calls, insuring greater privacy for callers and greater immunity from air time fraud.

Despite the numerous advantages afforded by CDMA, the capacity of conventional CDMA systems is limited by the decoding process. Because so many different user communications overlap in time and frequency, the task of correlating the correct information signal with the appropriate user is complex. In practical implementations of CDMA, capacity is limited by the signal-to-noise ratio (S/N), which is essentially a measure of the interference caused by other overlapping signals as well as background noise. The problem to be solved, therefore, is how to increase system capacity and still be able to maintain a reasonable signal-to-noise ratio so that signal decoding can be carried out efficiently and accurately.

SUMMARY OF THE INVENTION

The present invention optimally decodes a coded information signal embedded in many other overlapping coded signals in a received composite signal by correlating a unique code corresponding to the signal to be decoded with the composite signal. After each coded information signal is decoded, it is removed from the composite signal. As a result, subsequent correlations of other information signals in the received composite signal may be performed with less interference and, therefore, with greater accuracy.

The subtractive demodulation technique is enhanced by decoding the composite signal in an order of the information signals from strongest to weakest signal strength. In other words, the strongest signal is correlated and removed first. Interference caused by the presence of the strongest information signal in the composite signal during the decoding/correlation of weaker signals is thereby removed. Thus, the chances of accurately decoding even the weakest signal are greatly improved.

In a preferred embodiment of the invention, the composite signal is decoded using iterative orthogonal transformations with a set of codewords to generate a plurality of transformation components associated with the codewords. The coded information signal corresponding to the greatest transformation component is extracted from the composite signal. During the iterative process, periodic orthogonal transformations are performed on the remaining portion of the composite signal using at least one of the codewords involved in an earlier transformation. Any transformation component corresponding to an associated index of the previous code word is eliminated to reduce residual interference/errors that may have been generated in the previous transformation process. This reorthogonalization process is also used to remove signal echoes from the composite signal.

BRIEF DESCRIPTION OF THE DRAWINGS

The present invention will now be described in more detail with reference to preferred embodiments of the invention, given only by way of example, and illustrated in the accompanying drawings, in which:

FIG. 2 shows a series of graphs illustrating how CDMA signals are generated;

FIG. 11 is a flow chart illustrating a process by which residual interference is removed according to the present invention.

DETAILED DESCRIPTION OF THE PREFERRED EMBODIMENTS

Figure 1A:
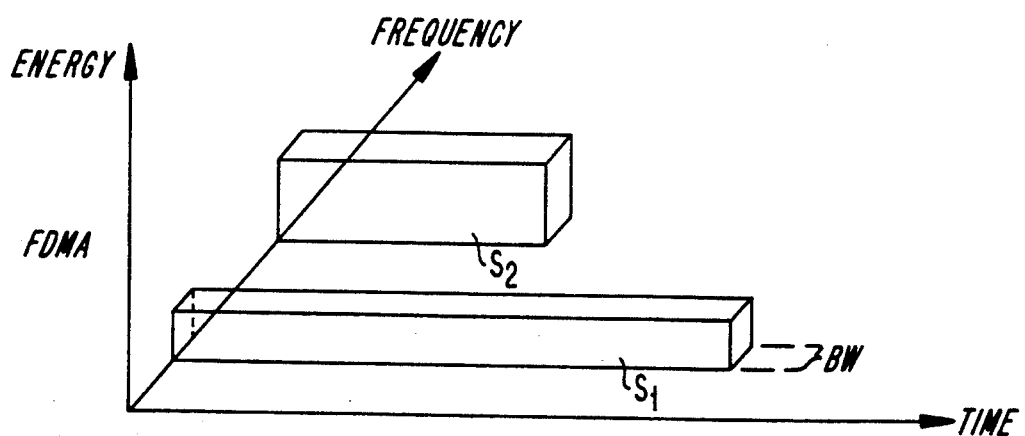
FIGS. 1(a)-1(c) are plots of access channels using different multiple access techniques.
Figure 1B:
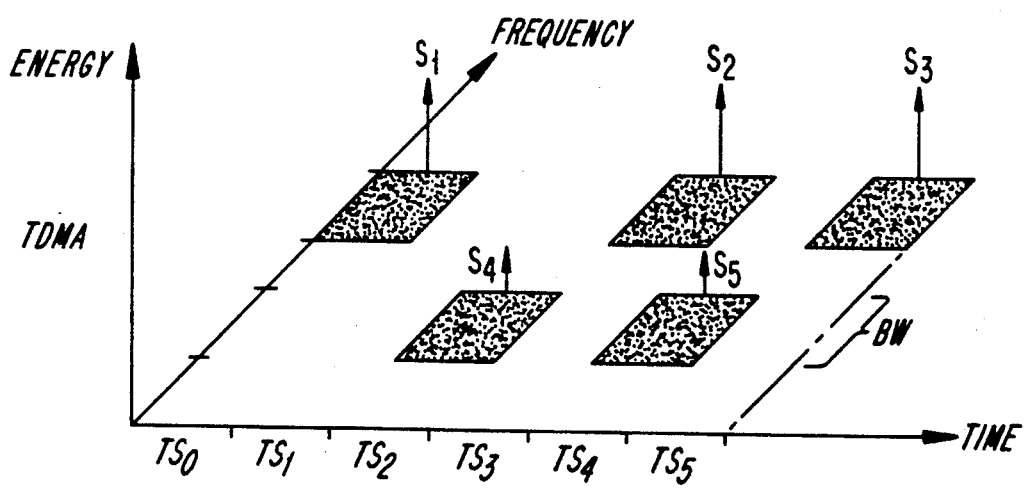
Figure 1C:
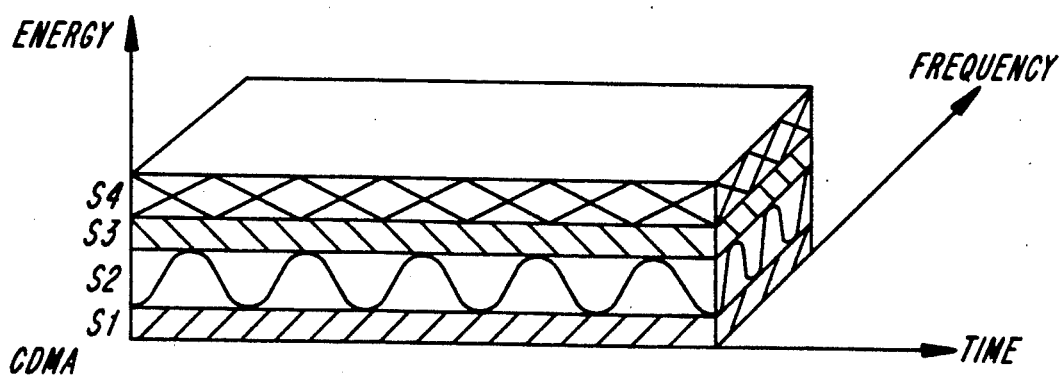

While the following description is in the context of cellular communications systems involving portable or mobile radio telephones and/or personal communication networks, it will be understood by those skilled in the art that the present invention may be applied to other communications applications.

The present invention will now be described in conjunction with the signal graphs shown in FIGS. 2-4 which set forth example waveforms in the coding and decoding processes involved in traditional CDMA systems. Using these same waveform examples from FIGS. 2-4, the improved performance of the present invention over conventional CDMA is illustrated in FIG. 5.

Two different data streams, shown in FIG. 2 as signal graphs (a) and (d), represent digitized information to be communicated over two separate communication channels. Signal 1 is modulated using a high bit rate, digital code unique to signal 1 as shown in signal graph (b). For purposes of the present invention, the term "bit" refers to one digit of the information signal. The term "bit period" refers to the time period between the start and the finish of the bit signal. The term "chip" refers to one digit of the high rate coding signal. Accordingly, the chip period refers to the time period between the start and the finish of the chip signal. Naturally, the bit period is much greater than the chip period. The result of this modulation, which is essentially the product of the two signal waveforms, is shown in the signal graph (c). In Boolean notation, the modulation of two binary waveforms is essentially an exclusive-OR operation. A similar series of operations is carried out for signal 2 as shown in signal graphs (d)-(f). In practice, of course, many more than two coded information signals are spread across the frequency spectrum available for cellular telephone communications.

Each coded signal is used to modulate a RF carrier using any one of a number of modulation techniques, such as Quadrature Phase Shift Keying (QPSK). Each modulated carrier is transmitted over an air interface. At a radio receiver, such as a cellular base station, all of the signals that overlap in the allocated frequency bandwidth are received together. The individually coded signals are added, as represented in the signal graphs (a)-(c) of FIG. 3, to form a composite signal waveform.

After demodulation of the received signal to the appropriate baseband frequency, the decoding of the composite signal takes place. Signal 1 may be decoded or despread by multiplying the received composite signal in the signal graph (c) with the unique code used originally to modulate signal 1, as shown in the signal graph (d). The resulting signal is analyzed to decide the polarity (high or low, +1 or −1, "1" or "0") of each information bit period of the signal.

These decisions may be made by taking an average or majority vote of the chip polarities during one bit period. Such "hard decision" making processes are acceptable as long as there is no signal ambiguity. For example, during the first bit period in the signal graph (f), the average chip value is +0.67 which readily indicates a bit polarity +1. Similarly, during the subsequent bit period, the average chip value is −1.33. As a result, the bit polarity was most likely a −1. Finally, in the third bit period, the average is +0.80 which indicates a bit polarity of +1. However, whenever the average is zero, the majority vote or averaging test fails to provide an acceptable polarity value.

In ambiguous situations, a "soft decision" making process must be used to determine the bit polarity. For example, an analog voltage proportional to the received signal after despreading may be integrated over the number of chip periods corresponding to a single information bit. The sign or polarity of the net integration result indicates that the bit value is a +1 or −1.

Figure 4:
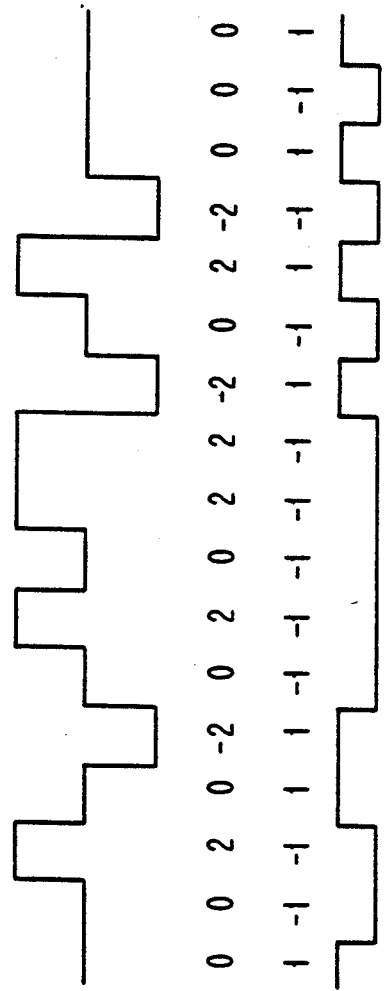
Figure 5:
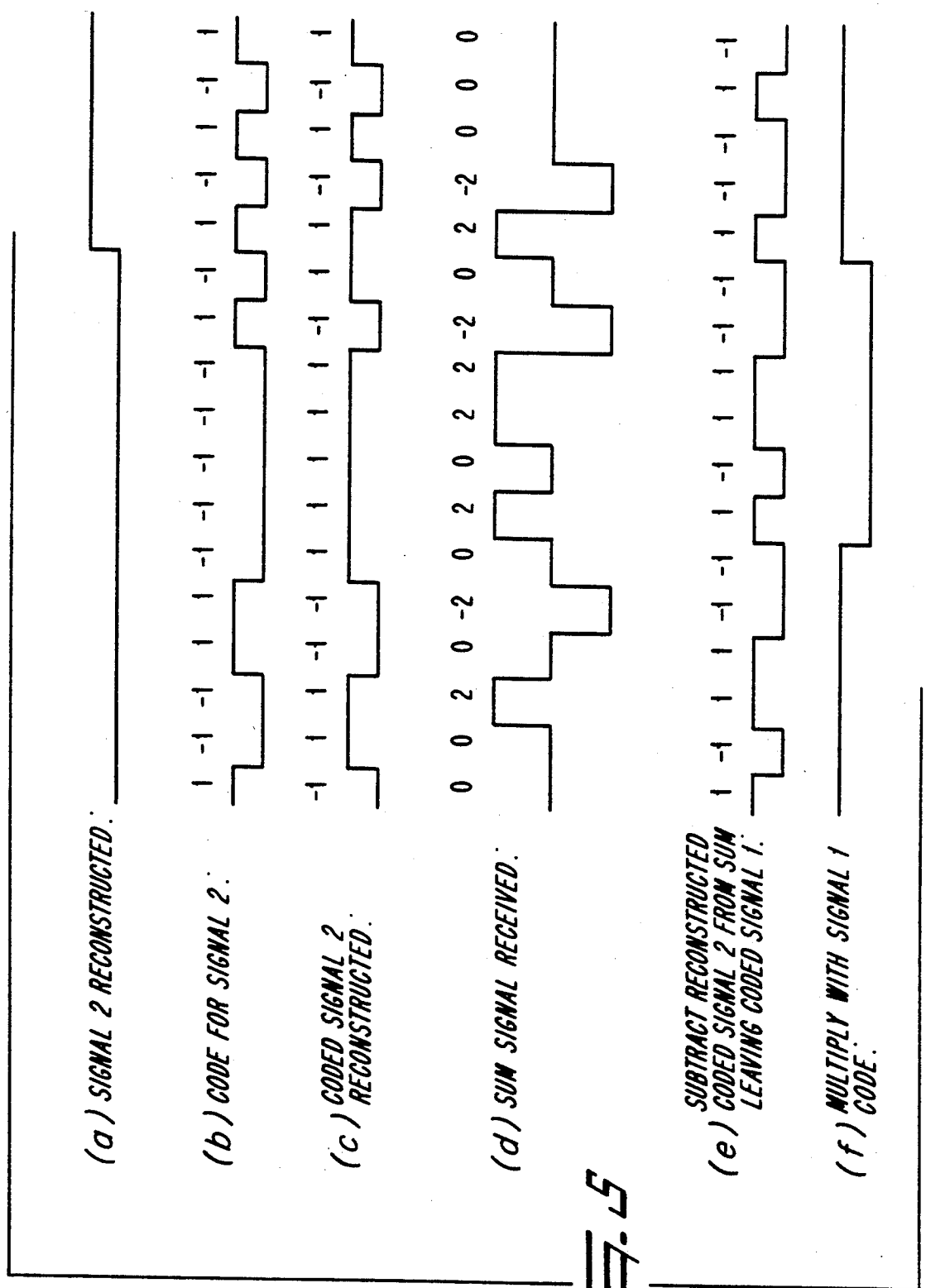
FIG. 5 shows a series of graphs illustrating CDMA subtractive demodulation according to the present invention.

The decoding of signal 2, similar to that of signal 1, is illustrated in the signal graphs (a)–(d) of FIG. 4. After decoding, there are no ambiguous bit polarity situations.

Theoretically, this decoding scheme can be used to decode every signal that makes up the composite signal. Ideally, the contribution of unwanted, interfering signals is minimized if the digital spreading codes are orthogonal to the unwanted signals. Two codes are orthogonal if exactly one half of their bits are different. Unfortunately, only a certain number of orthogonal codes exist for a finite word length. Another problem is that orthogonality can be maintained only when the relative time alignment between two signals is strictly maintained. In communications environments where portable radio units are moving constantly, such as in cellular systems, time alignment is difficult to achieve.

When code orthogonality cannot be guaranteed, noise-based signals may interfere with the actual bit sequences produced by different code generators, e.g., the mobile telephone. In comparison with the originally coded signal energies, however, the energy of the noise signals is usually small. The term "processing gain" is often used to compare relative signal energies. Processing gain is defined as the ratio of the spreading or coding bit rate to the underlying information bit rate. Thus, the processing gain is essentially the spreading ratio. The higher the coding bit rate, the wider the information is spread and the greater the spreading ratio. For example, a one kilobit per second information rate used to modulate a one megabit per second coding signal has processing gain of 1000:1.

Large processing gains reduce the chance of decoding noise signals modulated using uncorrelated codes. For example, processing gain is used in military contexts to measure the suppression of hostile jamming signals. In other environments, such as cellular systems, processing gain refers to suppressing other, friendly signals that are present on the same communications channel with an uncorrelated code. In the context of the present invention, noise includes both hostile and friendly signals. In fact, noise is defined as any other signals other than the signal of interest, i.e., the signal to be decoded. Expanding the example described above, if a signal-to-interference ratio of 10:1 is required, and the processing gain is 1000:1, conventional CDMA systems have the capacity to allow up to 101 signals to share the same channel. During decoding, 100 of the 101 signals are suppressed to 1/1000th of their original interfering power. The total interference energy is thus 100/1000 or 1/10 as compared to the desired information energy of one (1). With the information signal energy ten times greater than the interference energy, the information signal may be correlated accurately.

Together with the required signal-to-interference ratio, the processing gain determines the number of allowed overlapping signals in the same channel. That this is still the conventional view of the capacity limits of CDMA systems may be gleaned by reading, for example, "On the Capacity of a Cellular CDMA System," by Gilhousen, Jacobs, Viterbi, Weaver and Wheatley, Trans. IEEE on Vehicular Technology, November 1990.

In contrast to the conventional view, an important aspect of the present invention is the recognition that the suppression of friendly CDMA signals is not limited by the processing gain of the spread spectrum demodulator as is the case with the suppression of military type jamming signals. A large percentage of the other signals included in a received, composite signal are not unknown jamming signals or environmental noise that cannot be correlated. Instead, most of the noise, as defined above, is known and is used to facilitate decoding the signal of interest. The fact that most of these noise signals are known, as are their corresponding codes, is used in the present invention to improve system capacity and the accuracy of the signal decoding process.

Rather than simply decode each information signal from the composite signal, the present invention also removes each information signal from the composite signal after it has been decoded. Those signals that remain are decoded only from the residual of the composite signal. Consequently, the existence of signal transmissions in the communications channel from the already decoded signals do not interfere with the decoding of other signals. For example, in FIG. 5, if signal 2 has already been decoded as shown in the signal graph (a), the coded form of signal 2 can be reconstructed as shown in the signal graphs (b) and (c) and subtracted from the composite signal in the signal graph (d) to leave coded signal 1 in the signal graph (e). Signal 1 is recaptured easily by multiplying the coded signal 1 with code 1 to reconstruct signal 1. It is significant that had the conventional CDMA decoding method been unable to determine whether the polarity of the information bit in the third bit period of signal 1 was a +1 or a −1 in the signal graph (f) of FIG. 3, the decoding method of the present would effectively resolve that ambiguity simply by removing signal 2 from the composite signal.

Figure 6:
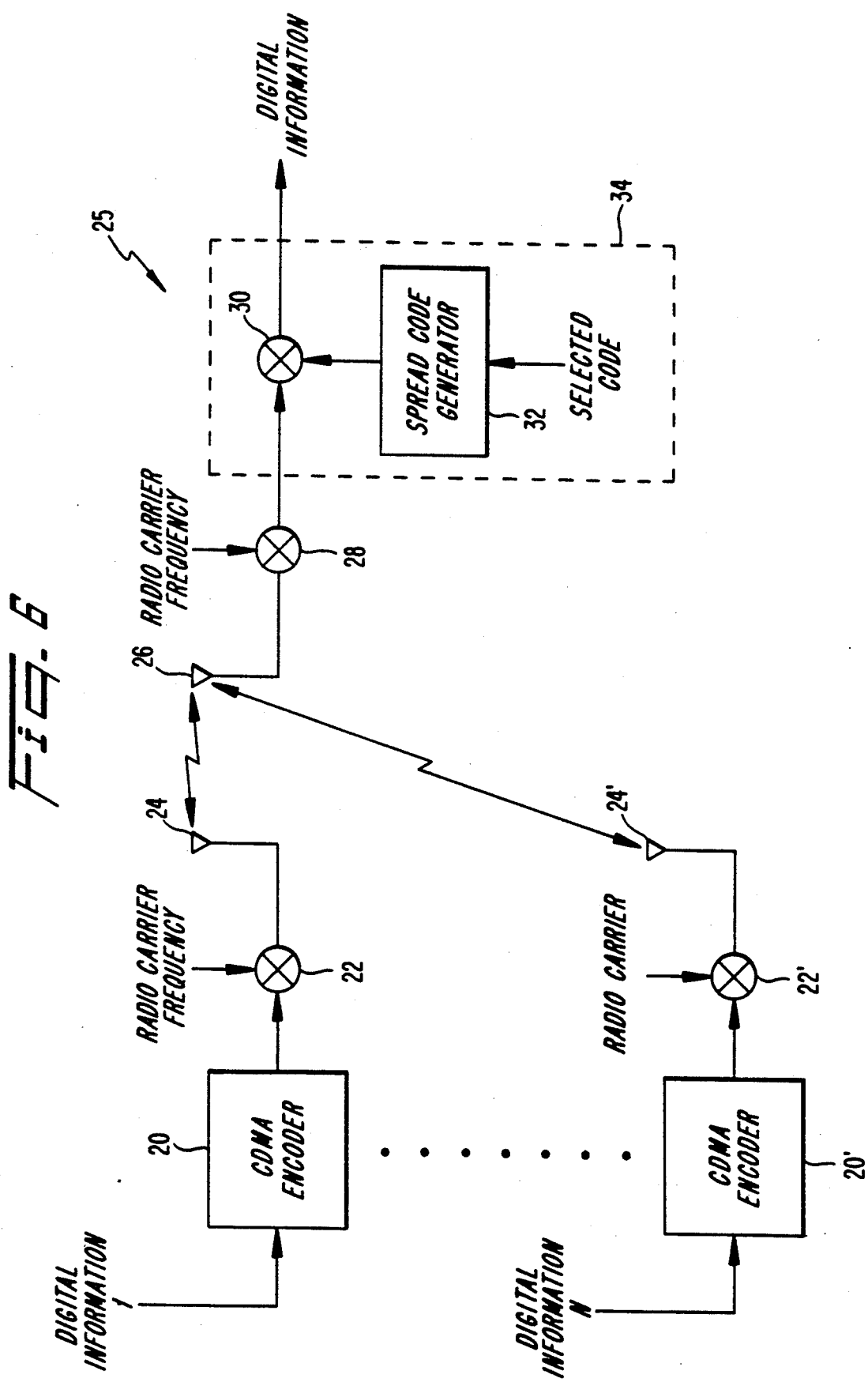
FIG. 6 is a functional schematic of a CDMA transmitter and receiver.

FIG. 6 illustrates a conventional CDMA system. Digital information 1 to be transmitted over an RF communications channel is coded in a CDMA encoder 20. The coded signal is used to modulate an RF carrier in a mixer 22. The modulated carrier is transmitted over the air interface via a transmitting antenna 24. Other digital information from other transmitters (2 . . . N) may be transmitted in a similar fashion. A receiving antenna 26 of a radio receiver 25 receives a composite, RF signal and demodulates the composite signal using another mixer 28. The desired signal is extracted from the composite signal by multiplying the corresponding code used to originally code the desired signal in the CDMA encoder 20 with the composite signal. In theory, only the appropriate signal is correlated and reconstructed in a decoder 34.

Figure 7:
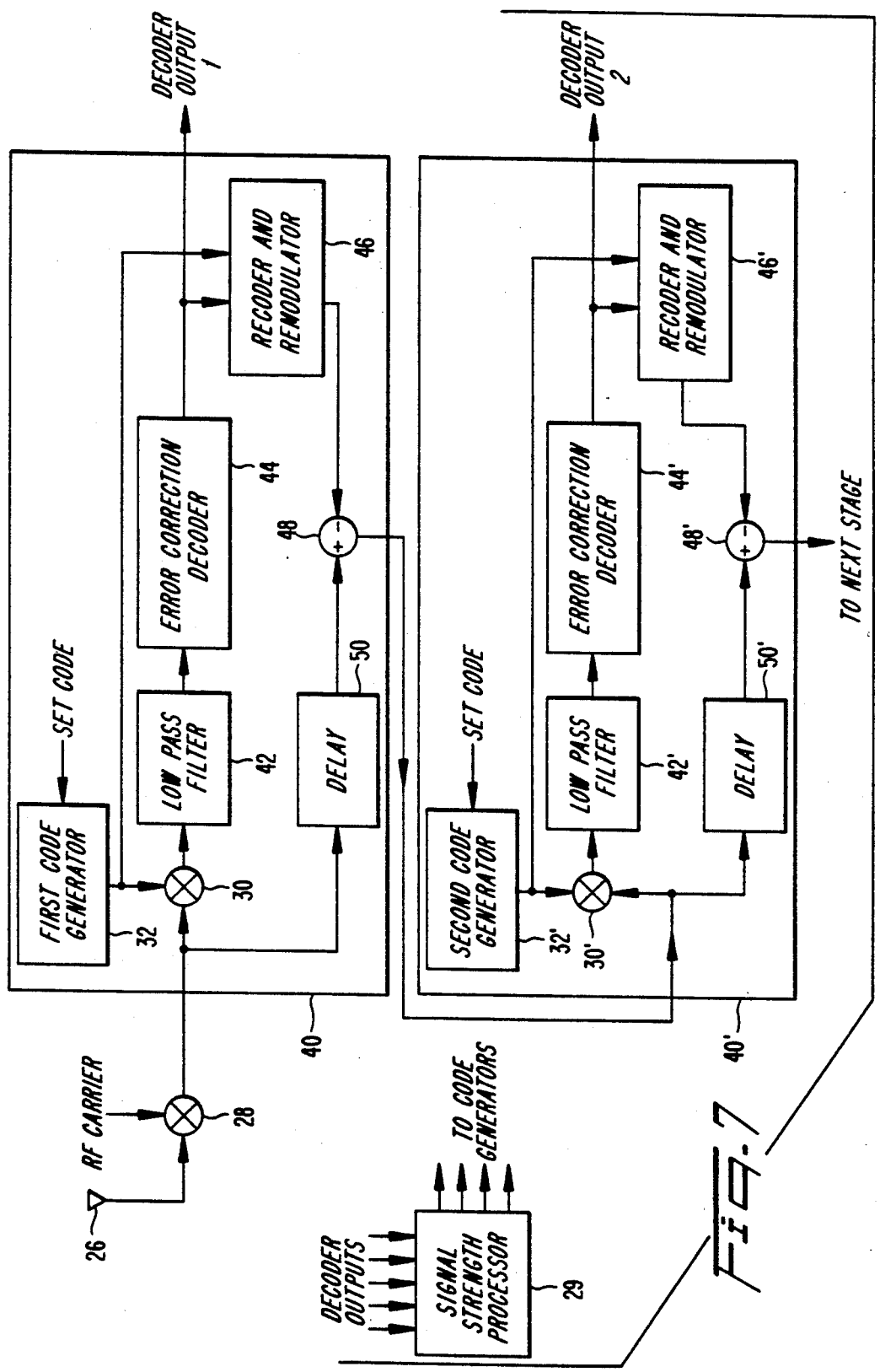
FIG. 7 is a functional schematic of a CDMA subtractive demodulator according to the present invention.

A detailed embodiment of the decoder 34 will now be described in conjunction with FIG. 7. A multiplicity of coded signals overlapping in the same communications channel is received at the antenna 26 as a composite, RF signal. The demodulator 28 converts the received RF signal to a convenient frequency for processing. Such a convenient frequency may, for example, lie around zero frequency (DC), and the composite signal may consist of complex factor components having real and imaginary or I and Q components. A first digital processing block 40 includes a first code generator 32 set to match the code of the first signal to be demodulated. While the specific code to be set by the code generator 32 in the first data processing block 40 may be selected arbitrarily, in the preferred embodiment of the present invention, the order in which the codes are generated is based on signal strength. A signal strength processor 29 monitors the relative signal strengths of each of the signals that make up the composite signal. In the context of cellular systems, if the mobile switching center (MSC)

or the base stations (BS) monitors the probable or actual signal strengths of each mobile telephone communication, either the MSC or the BS may perform the tasks of the signal strength processor 29.

Figure 8:
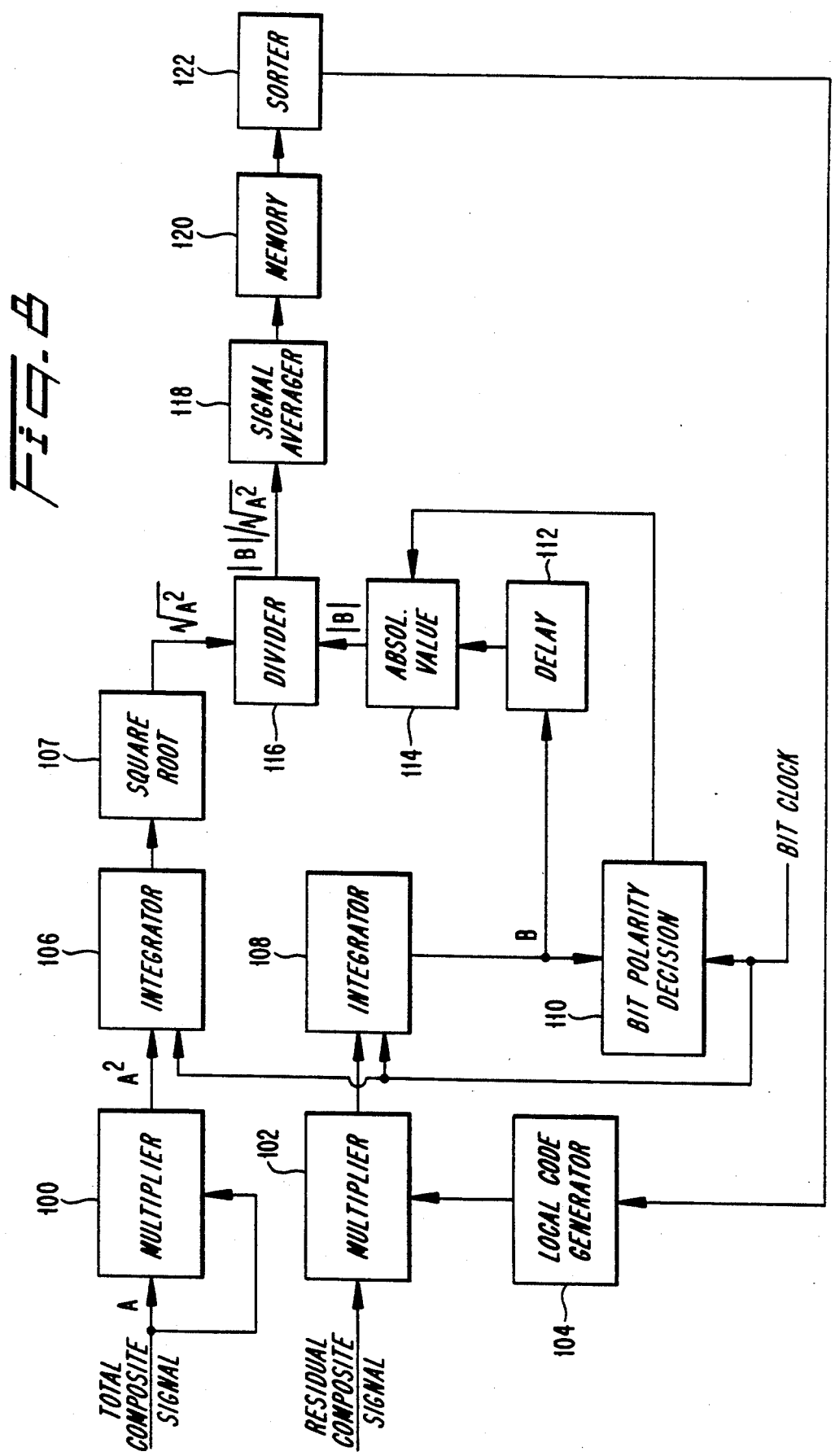
FIG. 8 is a functional schematic of the signal strength processor illustrated in FIG. 7.

It will be appreciated that signal strength can be detected by the signal strength processor 29, or it can be predicted based upon historical models of signal strength. A function block diagram depicting a hardware implementation for performing the functions of the signal strength processor 29 will now be described in conjunction with FIG. 8. It will be appreciated by those skilled in the art that these functions could also be implemented using a suitably programmed microprocessor. The total composite signal received by the antenna 26 is squared in multiplier 100, and integrated in an integrator 106 over the number of chip periods in a bit period. A bit clock signal determines the integration interval. A square root circuit 107 determines the root mean square (RMS) value of the composite signal over the bit period.

At the same time, the residual signal is received in a multiplier 102. The residual signal comprises the total composite signal minus any prior decoded signals. The residual signal is multiplied by a spreading code generated by a local code generator 104 of the signal to be decoded. The correlated output signal from the multiplier 102 is also integrated over the same bit period in an integrator 108, as controlled by the bit clock signal. As described, for example, with respect to the signal graphs (e) and (f) in FIG. 3, the average or integrated voltage value over the integrated time period may have a positive or a negative polarity. Thus, a bit polarity decision device 110 detects the signal polarity and transmits a signal to an absolute value device 114 which insures that the sign of the integrator 10B output signal, delayed by a delay 112, is always positive. The absolute value device 114 may be, for example, an invertor controlled by the bit polarity decision device 110.

The absolute value of the average correlation signal (B) is divided in a divider 116 by the square root of the mean value of the total composite signal squared ($A^2$) for the same bit period to generate a normalized value. In other words, the correlation strength of the decoded signal B is normalized by dividing it by the total composite strength of the signal for that bit period. The normalized correlation of the decoded signal is accumulated in a signal averager 118 over a number of bit periods to generate a relative mean strength for that decoded signal. Due to multipath fading of the signal, the actual number of bit periods should probably be on the order of about ten in order to determine an accurate average signal strength of the demodulated signal. Each local code is stored in a memory 120 along with its associated average strength value. A sorter 122 compares each of these average signal strength values and sorts them from strongest to weakest. At that point, the sorter 122 transmits the local spreading code of the strongest signal to the local code generator 104 so that the strongest signal is always demodulated and extracted at the next data bit period. Lesser strength signals are demodulated in order of signal strength as determined by the sorter 122. The sorter 122 functions may be readily implemented by a microprocessor using a software sorting program.

Because the signal strengths of the multiple mobile stations in a cell are constantly varying, a further embodiment of the present invention utilizes linear predictive analysis (LPA) to reorder the signal strength priority. In general terms, a historical model of the relative signal strengths is stored in a memory and used to extrapolate which signal is most likely to have the greatest strength at the next instant in time. LPA postulates that the next value of a waveform will be a weighted sum of previous values with the weight coefficients to be determined. The known Kalman filter algorithm may be used to implement this analysis. In this manner, the strongest signal may be predicted effectively without having to actually perform another sequence of signal decoding and measurements.

If the signal strength processor 29 determines that the actual results of the decoding of the composite signal and signal strength priority sequence is in error because of an inaccurate prediction or because system conditions have changed, the signal strength processor 29 reorders the code sequence to reflect the actual signal strength order. Subsequently, the demodulation process may be repeated to insure that the individually coded signals of the composite signal are decoded in the order of greatest to least signal strength. The repeated process does not result in any loss of data or interruption in traffic because the composite signal is stored in a delay 50 in the processing block 40. The delay 50 may be simply a memory device. Consequently, the composite signal may be retrospectively reprocessed once the optimum order of decoding is determined.

By correlating the output signal of the first code generator 32 with the composite signal received at the correlator 30, an individual signal corresponding to the first code is extracted from the composite signal. The correlated signal is filtered in a low pass filter 42 in order to reject interference generated by noise and unrelated signals. Instead of the low pass filter 42, a majority vote circuit or an integrate and dump circuit may be used to reduce or despread the bandwidth or bit rate of the correlated signal. The output signal generated by the low pass filter 42 is processed further in an error correction decoder 44 which finally reduces the signal bandwidth or bit rate to the underlying digital information. The decoded, information signal may undergo additional signal processing before it reaches its final destination.

The error corrected output signal is also applied to a recoder/remodulator 46 to reconstruct the waveform of the signal just decoded. The purpose for reconstructing/recoding the decoded signal is to remove it from the composite signal in a subtractor 48. A delay memory 50 stores the composite signal for the processing time required to first decode and then reconstruct the first decoded signal.

The residual composite signal, from which the first signal has been decoded and subtracted, is passed from the subtractor 48 to the input of a second digital processing block 40, similar to the first block 40. The only difference between the two digital processing blocks 40 and 40, is that the code generator 32, is programmed to match the code corresponding to a second signal to be demodulated. In the preferred embodiment of the invention, the second signal to be demodulated is the signal having the next greatest signal strength. Those skilled in the art will recognize that the second signal processing block 40' may be implemented by recursive use of the first signal processing block 40 in order to avoid duplicating hardware. The second signal processing block 40' produces a second, decoded signal from the error correction decoder 44' and subtracts a reconstructed, second signal from the delayed composite signal in a subtractor 48'. The residual, composite signal, with two signals now removed, is passed to a third stage of signal processing and so on.

It will be appreciated that a key element of the present invention is that the sequence of demodulation and extraction of individual information signals is in the order of highest signal strength to lowest signal strength. Initially, when the composite signal includes many signals, the signal most likely to be detected accurately is the signal having the greatest signal strength. Weaker signals are less likely to interfere with stronger signals. Once the strongest signal is removed from the composite signal, the next strongest signal may be readily detected without having to account for the interference of the strongest signal. In this fashion, even the weakest signal may be accurately decoded. Because of this enhanced decoding capability, the present invention performs satisfactorily even with a significant increase in the number of users typically handled in conventional CDMA systems. Thus, increased capacity is achieved.

By increasing the number of mobile accesses over the same communications channel, a steady-state level of activity is achieved in which the signal strength processor 29 continuously determines the relative instantaneous levels of all information signals being processed. The ultimate capacity limit of this system is reached when the power of a signal is exceeded by the sum of the powers of all lower power signals by more than the available processing gain (less any desired signal-to-noise ratio). This limit, however, is considerably more favorable than the conventional limit which is reached when the sum of the power of all the stronger signals exceeds the power of the weakest signal by more than the available processing gain.

In estimating the capacity gain, the Rayleigh distribution is used as a representative signal level distribution in a cellular telephone environment. Assuming use of feedback power control, the long-term mean strength of all signals is unity. Consequently, the signal strength power exhibits the distribution function:

$$P(A)dA = 2A \exp(-A^2)dA$$

where A is the signal amplitude. The total power P of a large number N of such signals is simply N. If the processing gain or spreading ratio is R, the signal-to-interference ratio after despreading would be approximately $$S/I = A^2 R/N$$

for a conventional CDMA system. If S/I equals 1, signals of amplitude less than SQRT(N/R) would therefore not reach zero dB (equal power ratio) with respect to the interference after demodulation. If this is the threshold for acceptable decoding, a certain number of signals $$1 - e^{(-N/R)}$$

will not be decodable, and a certain number of signals $$e^{(-N/R)}$$

will be decodable. Thus, the maximum number of signals that can be decoded is $$N e^{(-N/R)}$$

When N is chosen to be equal to R, the number of decodable signals becomes N/e. Thus, the loss due to the signal strength distribution is a factor e. In practice, it is doubtful that this capacity could be reached while providing an adequate quality of service in a cellular system, as those signals that were decodable at one instant would belong to one set of mobiles and to another set of mobiles at another instant. To ensure that every mobile information signal is decodable 95% of the time, for example, would entail a substantial loss in capacity. This further loss is the margin that must be built in to the system capacity to allow for signal fading.

In the case of the present invention, however, each signal suffers from interference only from those having less than or equal amplitude. Those signals having a higher signal strength or amplitude have been demodulated first and removed.

The integral of all interference I up to an amplitude A is given by $$1 - (1 + A^2)\exp(-A^2)$$

The signal-to-interference ratio S/I after despreading a signal of amplitude A is thus $$\frac{S}{I} = \frac{R}{N} A^2/(1 - (A^2 + 1)\exp(-A^2))$$

Figure 9:
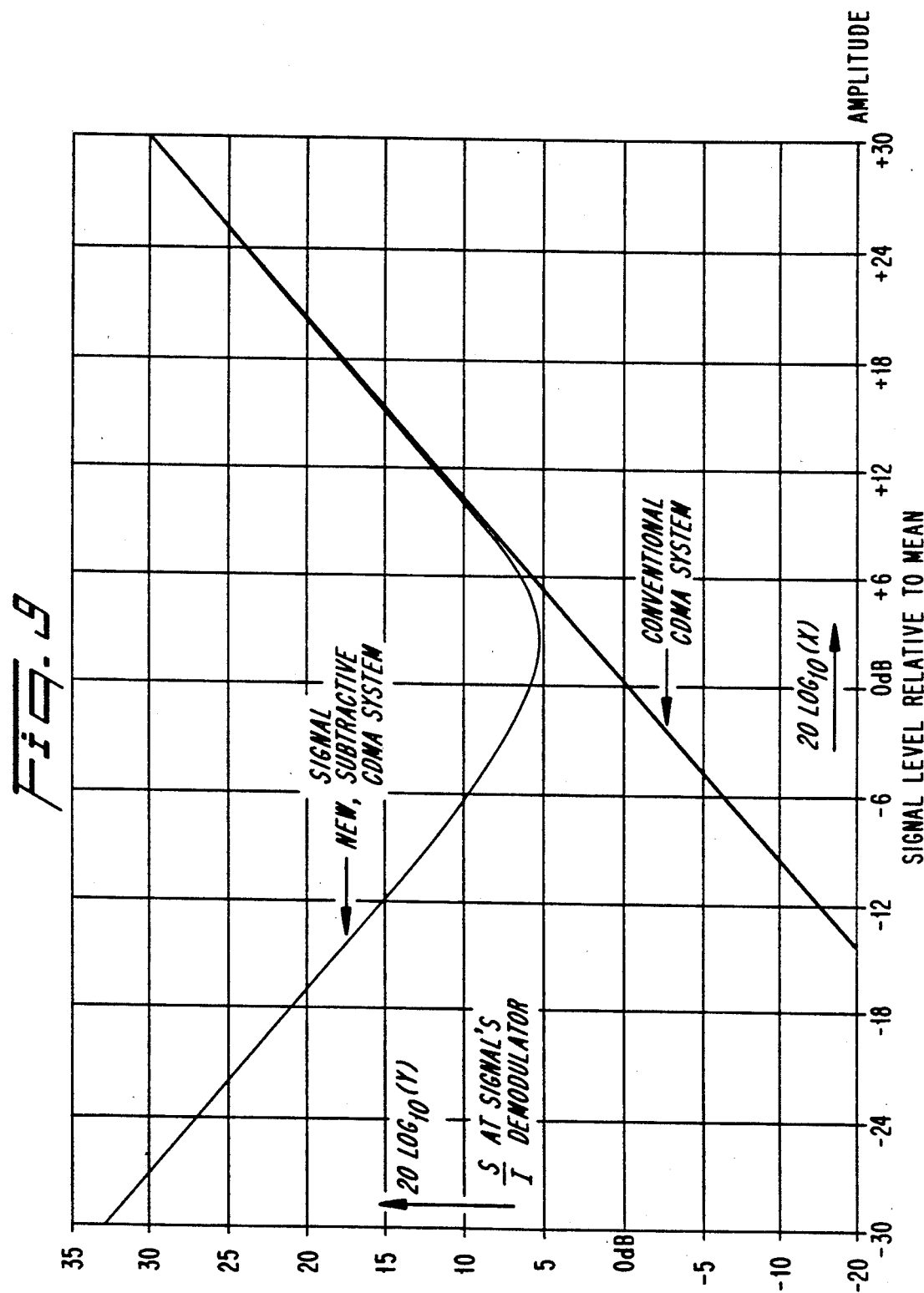
FIG. 9 is a graph comparing the signal-to-noise ratio of conventional CDMA with that of subtractive CDMA according to the present invention.

FIG. 9 is a plot of the function $$A^2/ (1 - (A^2 + 1)\exp(-A^2))$$

showing that it is never less than 5.8 dB (3.8:1 power ratio), with the minimum occurring at $A^2 = 1.79$. The S/I improves for signals having an amplitude larger than $(1.79)^{\frac{1}{2}}$ due to their greater power. In contrast with conventional CDMA systems, the S/I in the present invention, also improves for signals having an amplitude smaller than $(1.79)^{\frac{1}{2}}$ because fewer unsubtracted, interfering signals remain below this signal level.

Consequently, all signals are decodable provided that $$R/N > 1/3.8$$

that is $$N < 3.8R$$

Compared to the conventional CDMA demodulator capacity limit of $$N < R/e \text{ (without fading margin)}$$

the invention has a capacity advantage of 3.87e which is more than a tenfold increase. In addition, conventional systems have a significant fading margin. In the present invention, even the weakest, faded signals (at least with regard to interference with other signals and neglecting other noise sources), may be decoded accurately. Accounting for the fading margin, the capacity increase of the present invention is approximately 100 times greater than conventional CDMA systems.

It should be noted that the system capacity is limited only because of the possibility that the first signals being processed may be the weaker rather than the stronger signals. However, by taking advantage of the storage of the composite signal in the delay memory 50 and the ability to reprocess the composite signal retrospectively, a multiple-pass demodulation procedure may be applied to the composite signal. Of course, this procedure would only make a difference if the first pass demodulation produced errors in the decoded signals. Accordingly, redundant coding is preferably used to indicate the confidence in a decoded signal result. Based on that confidence code, the processing block 40 decides whether further passes will yield an improvement. One well known redundant coding procedure for assigning a confidence value to a particular decoding result is the majority vote technique. For example, if five redundant signals are compared and 4 or 5 have the same value, then a high confidence value is assigned to the result. The fewer signals that agree, the lower the confidence value. If the confidence value is high, no further demodulation passes are necessary. Conversely, a low confidence value dictates that the signals be re-sorted, and any signals having a greater strength be removed.

Figure 3:
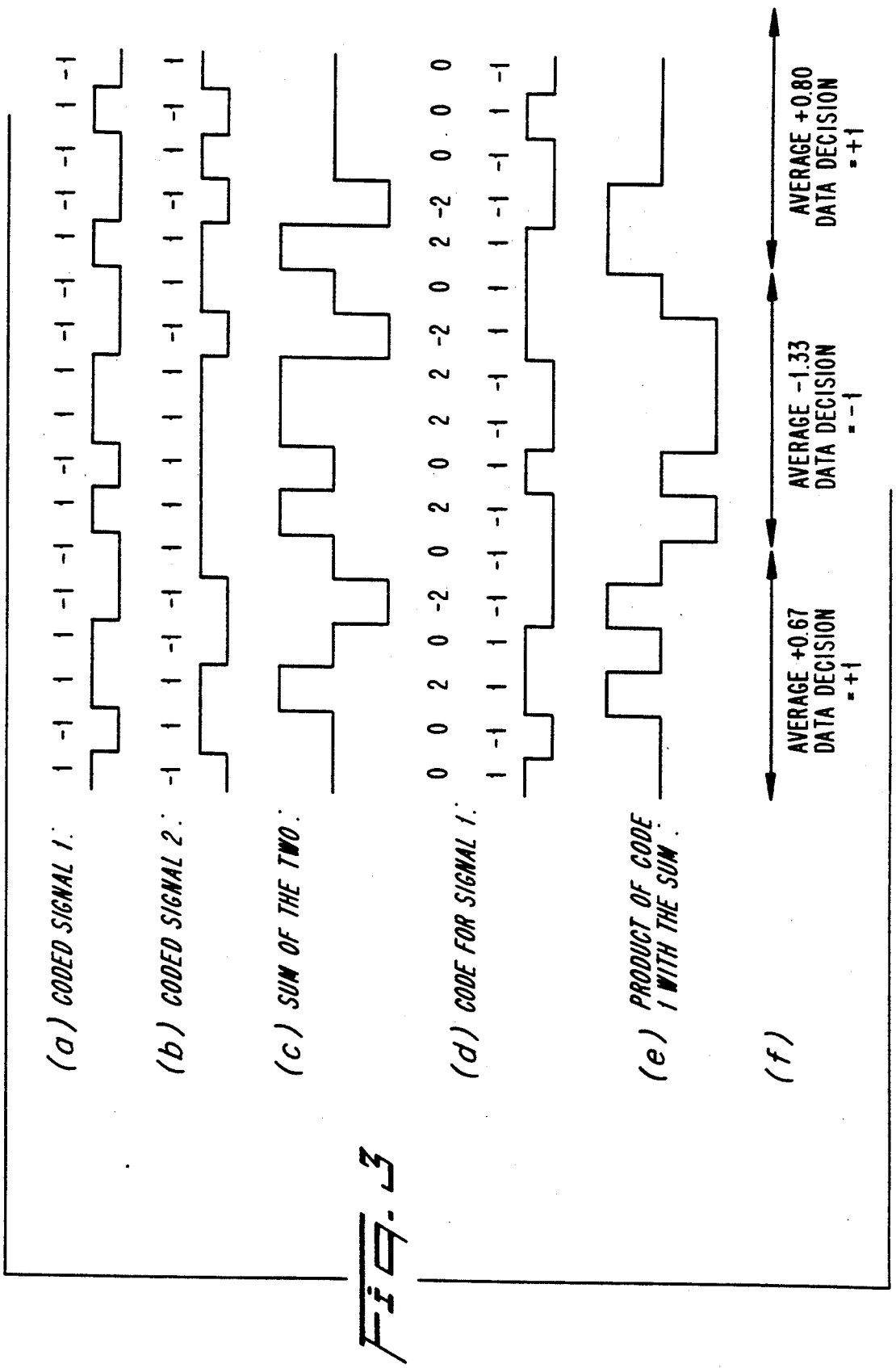
FIGS. 3 and 4 show a series of graphs for illustrating how CDMA signals are decoded.

While the principles of continuous spreading codes were described initially in conjunction with FIGS. 3-5, superior methods of spreading the spectrum of an information signal may be achieved using error correction coding. When a single binary information bit at a time is bandwidth expanded by a spreading ratio R to become a pseudo-random sequence of R bits, the bandwidth is spread without any error correction coding gain. As such, this technique may be termed simple spreading. On the other hand, spreading a block of M information bits at a time, where $M > 1$, to a pseudo-random sequence of $M \times R$ bits provides error correction coding gain within the same spreading factor. This latter technique is termed intelligent spreading.

Simple spreading may be regarded as converting an information signal as one of two possible coordinates $(-1)$ or $(+1)$ in a one dimensional space, e.g., on a line, into a signal that needs R dimensions to display it. A coordinate in any R dimensions may have only two possible values $-1$ or $+1$ (in Boolean notation 0 or 1). Such spaces are known as Galois fields. Correlating a signal with a code may be equated to finding its projection on a vector from the origin through a point whose coordinates are given by the bits of the code. Maximum correlation or projection of the signal is achieved if the end point of the signal vector and the code vector coincide. Coincidence occurs when no angle exists between the signal vector and the code vector. When a signal consists of a sum of signals, one of which coincides with the code, the others being at right angles to that code, correlation of the signal with that code yields a complex, correlation product corresponding to the desired signal demodulated. The other signals do not contribute to the resulting magnitude of the correlation product because they have zero projection on the correlation line $I+jQ$.

More generally, a sum of randomly coded signals may include one signal which coincides with a correlation code, the others having random projections on the code correlation line or vector. If the total length squared of any one of these other signals is, by Pythagoras, $a1^2 + a2^2 + a3^2 \ldots$ where a1, a2, a3 $\ldots$ are the projections on a number of different vectors or axes, then on average 1/R of the total squared length (or power) appears in any one dimension. Upon correlating with the first signal's code and subtracting a corresponding amount of the code vector, the residual signal has a zero projection along the code vector. Essentially, the signal has been projected onto a plane or subspace of R-1 dimensions, with 1/R of its power lying along the code correlation line having disappeared.

This loss of the total power along the code correlation line is termed the "correlative loss" of power of the remaining signals which occurs when a first signal is correlated with its own code and that first signal is subtracted from the total or composite signal. If the signals were all orthogonal, no such loss would occur. Otherwise, an average loss of 1/R, where the spreading ratio R is essentially the number of chips in the correlation of each remaining signal's power, occurs upon extraction of a prior, demodulated signal. An attempt to demodulate and extract R or more signals, with their respective codes spanning the whole R-dimensional space, would result in all vector components in all dimensions being removed after extraction of the Rth signal. No signal would be left to demodulate. The present invention allows more than R overlapping signals to be demodulated by reducing the correlation loss.

The magnitude of a demodulated signal to be subtracted from the composite signal may be based either on the signal amplitude after correlative despreading of the current information bit or on the signal amplitude of the previous information bit. The previous bit error is based on the values of the other signals that made up the composite signal when the previous bit was demodulated and removed. The present invention estimates the optimum amount of a decoded signal to be subtracted by employing at least several past amplitude measurements in a sequential estimation technique, such as a Kalman filter, which can be adapted to follow the fading pattern of a signal.

In another preferred embodiment of the present invention, signals are evaluated using "intelligent spreading" based on orthogonal or bi-orthogonal block coding of the information to be transmitted. In orthogonal block coding, a number M of bits to be transmitted are converted to one of $2^M$ available $2^M$-bit orthogonal codewords. A set of codewords can be constructed as follows:

The trivial case $M = 1$ produces two, 2-bit words $$W0 = \begin{vmatrix} 0 & 0 \end{vmatrix}$$
$$W1 = \begin{vmatrix} 0 & 1 \end{vmatrix}$$

which is regarded as a $2 \times 2$ bit matrix $$M1 = \begin{vmatrix} 0 & 0 \\ 0 & 1 \end{vmatrix}$$

The case for $M = 2$ may be constructed by forming a $4 \times 4$ bit matrix M2 by means of the following recursion relation:

$$M2 = \begin{vmatrix} M1 & M1 \\ M1 & \overline{M1} \end{vmatrix} \text{ and in general}$$

$$M(i+1) = \begin{vmatrix} Mi & Mi \\ Mi & \overline{Mi} \end{vmatrix}$$

These matrices are known as Walsh-Hadamard matrices.

Decoding these orthogonal codes involves correlation with all members of the set of codewords. The binary index of the codeword giving the highest correlation yields the desired information. For example, if a correlation of 16, 16-bit codewords numbered 0 to 15 produces the highest correlation on the tenth 16-bit codeword, the underlying signal information is the 4-bit binary word 1010 (10 in binary). Such a code is also termed a [16,4] orthogonal block code and has a spreading ratio R equal to 16/4=4.

If the Walsh-Hadamard matrices are augmented using the complementary codewords, (all 16 bits are inverted), one further bit of information may be conveyed per codeword. Thus, 5 bits of information are conveyed by transmitting one of 16 codewords or one of their 16 complements, providing a total choice of 32. This type of coding is known as bi-orthogonal coding. For higher spreading ratios, a [128,8] bi-orthogonal block code may be used, having a 16:1 spreading ratio. Indeed, [256,9], [512,10], ... [32768,16]... etc. bi-orthogonal block codes may be used.

The correlative loss involved in the abovedescribed process is as follows. At each stage, the Walsh spectrum component having the greatest correlation, is set to zero, effectively removing the signal just decoded. Thus, for the case of a [128,7] code, 1/128 of the power on average is removed from the composite signal. It is recalled that the spreading ratio is 128/8=16. Therefore, the correlative loss is only 1/128 of the total power (0.04 dB) per decoded signal, compared to 1/16 of the total power for simple spreading of the same spreading ratio. By the use of block coding or a similar form of intelligent spreading, the subtractive demodulation according to the present invention may be employed to decode and extract from a composite signal a number of information-bearing signals that exceed the bandwidth expansion ratio of the code, without encountering excessive correlative loss.

Using modulo-two addition, a scrambling code may be added to the block code to insure that the coding is different for each signal. The scrambling code may even change randomly from block to block. Modulo-2 addition of a scrambling code corresponds, in a Galois field, to applying an axis rotation. The scrambling code may be descrambled by modulo-2 adding the correct scrambling code a second time at the receiver to align the axes once more with the codewords of the Walsh-Hadamard matrix.

A significant feature of the present invention is that simultaneous correlation with all the orthogonal block codewords in a set may be performed efficiently by means of the Fast Walsh Transform. In the case of a [128,7] code for example, 128 input signal samples are transformed into a 128-point Walsh spectrum in which each point represents the value of the correlation of the composite signal with one codeword. Such a transform process will be described below.

Figure 10:
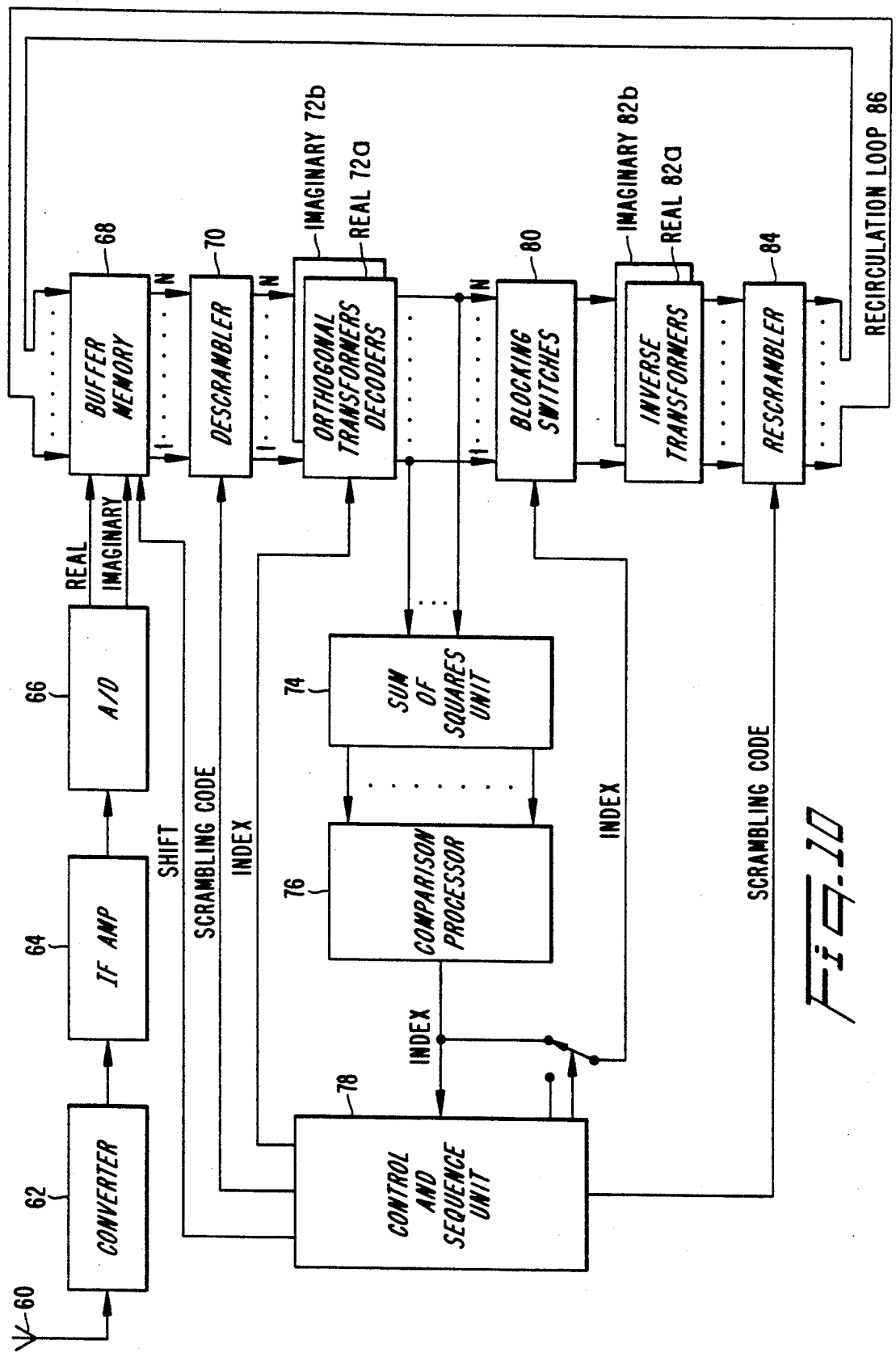
FIG. 10 is a functional schematic of a CDMA subtractive demodulator that eliminates residual noise according to the present invention.

With reference to FIG. 10, the composite signal from a radio transmission is received by way of an antenna 60 and converted to a suitable, intermediate frequency in a conventional converter device 62 such as a superheterodyne receiver which includes a filtering stage, an amplification stage, and a mixing stage. The intermediate frequency output signal of the converter 62 is further amplified and filtered in an intermediary frequency amplifier 64 before being applied to a conventional analog-to-digital (A/D) converter 66. The A/D converter 66 provides a numerical output of complex numbers that represent the instantaneous vector components of the intermediate frequency signal. This conversion process may be accomplished by any one of a variety of techniques known to those skilled in the art including correlating or mixing the IF signal with cosine and sine (quadrature) reference signals to extract the cartesian vector components for separate digitization.

Samples of the sequence of complex numbers from the A/D converter 66 are collected in a buffer memory 68. Each block of samples collected in the buffer memory 68 is descrambled according to a scrambling code provided by a control and sequence unit 78. The descrambler 70 removes the scrambling code by either inverting a signal sample or not according to the corresponding bit polarity of the scrambling code. The descrambled signals (1 ... N) are transferred to a Fast Walsh transform block decoder 72 which generates the Walsh spectrum for the real 72a and imaginary 72b components of the complex samples. In other words, a number of values are generated representing the degree of correlation between the composite signal received and each of the orthogonal code words. The signals whose axes were correctly aligned in the Galois field by the descrambling operation yield one dominant component in the Walsh spectrum whose index or address and sign convey a certain number of bits. Each Walsh transform component is identified by that index such that in our example the 78th component of the 128 components has an index of 78. Other components of the spectrum are caused by noise and differently scrambled signals.

A computation unit 74 receives the Fast Walsh transform correlation components and sums the squares of the real and imaginary components of each correlation component. A comparison processor 76 determines which correlation component has the maximum squared magnitude and sets that component to zero. The comparison processor 76 may operate by comparing pairs of correlation component magnitudes and passing the greater of the two values to further comparison stages, e.g., via a binary tree, so that the largest global component value and its associated codeword are generated at the last stage.

The comparison processor 76 generates an index associated with the component having the greatest magnitude to address and operate a corresponding switch of the multiple blocking switches 80. Being blocked by an open switch, the largest correlation component is effectively set to zero. Meanwhile, the remaining correlation components are transferred to an inverse Walsh-Hadamard transform circuit 82 having real and imaginary sections 82a and 82b. After inverse transformation, the samples are rescrambled in a rescrambler 84 using the scrambling code previously used by the descrambler and returned to the buffer 68 through a recirculation loop 86. Thus, the remaining portion of the composite signal generated by the rescrambler 84 represents the original composite signal minus the just decoded signal.

The magnitude of each correlated signal's representative signal strength is stored in the control and sequencing unit 78 along with its corresponding scrambling code and transformation index. The scrambling codes, therefore, are used in the preferred embodiment as an efficient method of monitoring and ordering the signal strengths of the various information signals in the composite signal. As described in detail above, before (and during) the demodulation process, the control and sequencing unit 78 orders the scrambling codes from greatest to weakest based on the relative signal strength of their corresponding correlated signal magnitudes. As a result, after each signal demodulation and extraction, the scrambling code having the next greatest magnitude is transmitted to the descrambler 70 for the next signal demodulation.

The composite signal, with a first decoded signal removed according to the subtractive principle of the invention, is descrambled again using a descrambled code of a second signal to be decoded and transmitted to a second Fast Walsh transform operation for decoding, and so on. As described previously, the order in which signals are decoded and subtracted by the above means is governed by the order of use of the descrambling codes, which in the preferred embodiment is in descending order of the predicted strengths of their corresponding information signals. This process is repeated a number of times to decode a number of signals.

With any subtractive signal extraction process there is a limit to the accuracy with which a decoded signal may be subtracted, and therefore, a limit to the amount that signal may be suppressed. The residual component, i.e., the decoding error, represents an interference floor that may hinder the subsequent demodulation of weaker signals. Spurious correlations with other, overlapping signals yet to be decoded also contributes to the magnitude of the residual component. As a result, zeroing a particular transform component may cause an undershoot or overshoot of the amount of the transform component subtracted. In a simplified example, assume the transform or correlation component magnitude corresponding to a codeword C1 for coded information signal 1 is X. However, because spurious correlations Y arise from other, non-orthogonal coded signals, the total correlation is X+Y. Extracting the total correlation for codeword C1 by setting this transform component to zero causes an error of −Y (C1) compared to removing only the actual signal component X. This error of (−Y) times the codeword translates as a residual interference component or error signal that hinders the subsequent decoding of weaker signals.

The mathematical term for removing a portion or a component of a signal that correlates with a particular codeword is called orthogonalization with respect to that codeword. The following mathematical analysis applies to a reorthogonalized process of the present invention where residual interference or error components are removed.

If Ci represents a scrambled, orthogonal code word set, Ci(k) is the k'th codeword of that set. Since the codewords are orthogonal, Ci can be thought of as a set of mutually perpendicular axes with a particular codeword Ci(k) lying along a single axis k.

Ci(0) is designated as the codeword transmitted for signal number i. If signal i has amplitude ai, then the composite signal radiated by the base station is:

$$S1 = a1C1(0) + a2C2(0) + a3C3(0)$$

To demodulate the composite signal (S1), each of the codewords C1(k) is correlated with S1 to obtain a series of correlation components:

$$r1(k) = a1[C1(0).C1(k)] + a2[C2(0).C1(k)] + a3[C3(0).C1(k)]...$$

where a dot "." between two codewords, e.g., C1(0).C1(k), denotes the dot product. The codewords are assumed normalized so that the dot product of a codeword with itself is unity, i.e., $C1(0) \cdot C1(0) = 1$ and
$C1(0) \cdot C1(k) = 0$, k not equal to 0 meaning that
$C1(0)$ and $C1(k)$ are orthogonal.

Therefore
$r1(0) = a1 + a2[C2(0) \cdot C1(0)] + a3[C3(0) \cdot C1(0)] +$
and
$r1(k) = a2[C2(0) \cdot C1(k)] + a3[C3(0) \cdot C1(k)] +$
for $k$ not zero.

Assuming that r1(0) is the largest component and subtracting r1(0)C1(0) from the original composite signal S1 results in a remaining composite signal S2:

$$S2 = a2[C2(0) - [C2(0) \cdot C1(0)]C1(0)] + a3[C3(0) - [C3(0) \cdot C1(0)]C1(0)] + \ldots$$

At this point, the ratio of the desired-to-undesired components of the first Walsh Transform is on the order of $$SNR1 = \frac{a1}{a2[C2(0) \cdot C1(k)]},$$

where SNR is the signal-to-noise ratio. The cross-correlation between two different codewords C2 and C1 is, in the ideal case, on the order of [1/root(N)] where N is the length of the codeword. Therefore, SNR1, being on the order [a1.root(N)/a2], improves as the ratio of a1-to-a2 is increased. Because the components proportional to a1 have all been extracted from S2, the quality of later demodulations is independent of the strength of the first signal. On the other hand, a component along the axis C1(0) remains, albeit proportional to the magnitudes a2, a3, etc., and not a1, due to the erroneous quantities of C1(0) having been subtracted.

To demodulate the second signal, S2 is correlated with C2(k) giving:

$$r2(0) = a2[1 - [C2(0) \cdot C1(0)]^2] + a3[C3(0) \cdot C2(0) - [C3(0) \cdot C1(0)][C1(0) \cdot C2(0)]] + \ldots$$

$$r2(k) = a2[C2(0) \cdot C1(0)][C1(0) \cdot C2(k)] + a3[C3(0) \cdot C2(k) - [C3(0) \cdot C1(0)][C1(0) \cdot C2(k)]] + \ldots$$

The signal-to-noise ratio for the second demodulation is, if a2 is much larger than a3, approximately equal to:

$$SNR2 = \frac{1}{[C2(0) \cdot C1(0)][C1(0) \cdot C2(k)]} = \text{of the order of } N$$

If a3 is comparable to a2, however, then SNR2 would be on the order of root(N) instead. Subtracting r2(0) times C2(0) from S2 results in a modified composite signal:

$$S3 = a2[(C2(0) \cdot C1(0))^2 C2(0) - (C2(0) \cdot C1(0)) C1(0)] +$$
$$a3[C3(0) - (C3(0) \cdot C1(0)) C1(0) + (C3(0) \cdot C1(0))(C1(0) \cdot C2(0)) C2(0)]$$

When S3 is correlated with C3(0), the desired signal component will approximate a3, but the residual interference components are principally from the term $$a2[C2(0) \cdot C1(0)][C1(0) \cdot C3(k)] = a2/N \text{ approx}$$

The interference to signal 3 is proportional to a larger signal, a2, and principally due to a residual code component of C1(0) from two subtractions earlier. Because this residual error signal persists even after extraction of further signals, it is increasingly more troublesome when decoding weaker signals.

The present invention removes this residual component error at periodic stages by a second orthogonalization defined as a reorthogonalization with respect to the codeword C1(0). This reorthogonalization is easily accomplished because C1(0) is already known from the first demodulation.

After reorthogonalization with respect to C1(0), the a2 term is defined as:

$$a2[(C2(0) \cdot C1(0))^2 C2(0) - (C2(0) \cdot C1(0))^3 C1(0)]$$

The term along the C1(0) axis has been reduced by about the factor N, e.g., 42 dB for N = 128. The terms in C1(0) with amplitude a3 are also reduced, and the dominant interference is now along the axis C2(0).

FIG. 11 illustrates a flow chart diagram that may be used to implement the present invention using the function block diagram of the hardware depicted in FIG. 10. Input signal samples of the composite signal are stored in the input buffer 68 and are received by a first signal extraction stage 101 for decoding and extracting the coded information signal having the greatest signal strength. The scrambling code 1 of that strongest signal to be decoded is used to descramble the composite signal in block 102. The Fast Walsh Transform is performed in block 104, and the largest transform component is determined in block 106. The index $I_1$ of that component is stored in the control and sequence unit 78 for possible use in a subsequent reorthogonalization stage.

With that signal extracted, the remaining signal undergoes an inverse Walsh transform in block 108 and is rescrambled in block 110 using the same scrambling code used in block 102. A second signal extraction stage 112 receives the remaining composite signal, and the index $I_2$ corresponding to the second strongest signal extracted is stored. A number of other signals may also be iteratively extracted according to this procedure until signal extraction stage J in block 114 where the residual error generated by the signal extraction in signal extraction stage 1 becomes potentially troublesome. At that point, a first reorthogonalization with index $I_1$ is performed in a first reorthogonalization stage 120. The remaining composite signal is again descrambled with scrambling code 1 in block 121. The descrambled signal undergoes a Fast Walsh transform in block 122, and the component corresponding to $I_1$ is set to zero in Step 124. In FIG. 10, this Index $I_1$ is transmitted to the transformer 72 along with the associated scrambling code 1. Thus, the residual error component at $I_1$ generated during the signal extraction at stage 1 is easily identified and removed by setting the component at $I_1$ to zero. The remaining components undergo an inverse Fast Walsh transform in block 126 and rescrambling with the scrambling code 1 in block 128.

Having reduced the residual interference or error, one or more further signals J+1 may now be decoded in signal extraction stages 130 until the residual error or interference caused by the decoding of the signal in the second stage 112 becomes troublesome. A second reorthogonalization stage is then performed with the index $I_2$ in block 132. This process continues until all of the signals have been satisfactorily decoded.

Reorthogonalization may be applied periodically or whenever the signal-to-interference ratio becomes marginal for decoding a particular signal. For purposes of the present invention, the term periodically also includes the situation where only one reorthogonalization stage is necessary. One way of determining a marginal signal-to-interference ratio, for example, is by comparing the magnitude of the largest correlation with that of the second largest. If the difference between the two is too small to preclude a decoding error, reorthogonalization with respect to a previously decoded signal is required.

Another method of implementing the reorthogonalization principles of the present invention takes advantage of the fact that the codewords for reorthogonalization are already known. When decoding the composite signal to extract one information signal, a Fast Walsh Transform correlates the composite signal using all of the codewords, e.g., all 128 codewords. The reorthogonalization procedure requires that the samples be correlated with only a single, previously decoded codeword having an associated index, e.g., $I_1$. Assuming a [128, 7] block code, buffer samples $(S_1, S_2, \ldots S_{128})$, and the bits of a specific codeword $CW_1$ $(b_1, b_2, \ldots b_{128})$ corresponding to the index $I_1$, the correlation C with that codeword $CW_1$ is $$C = \frac{b_1 S_1 + b_2 S_2 + \ldots + b_{128} S_{128}}{128}$$

The magnitude of that correlation C is subtracted from the buffer samples leaving sample values $S_1 - b_1 C$; $S_2 - b_2 C$; ... $S_{128} - b_{128} C$ in the buffer. Consequently, the sample values in the sample buffer 68 may be correlated using one reorthogonization codeword simply by adding or subtracting the buffer samples with the corresponding bits of the codeword, dividing the result by codelength (e.g., 128 bits) which is simply a bitshift when the codelength is a power of two, and then adding or subtracting the result to the original buffer samples again according to the polarity of corresponding codeword bits. Thus, reothorganization may be performed without executing a Fast Walsh Transform and an inverse Fast Walsh Transform; only subtraction and addition need be used.

If reorthogonalization with respect to previous codewords (e.g. CW1, CW2, ...) is required, and CW1 and CW2 are not orthogonal themselves, then reorthogonalization according to this method initially does not yield a result orthogonal to both codewords. Nevertheless, the desired result may be achieved by alternately repeating the reorthogonalization with CW1 and CW2. In practice, it is unlikely that repetition would be needed within one reorthogonalization step. Rather, additional reorthogonalization with those same codewords would likely be deferred until after the extraction of further signals.

With regard to the hardware described previously in FIG. 10, the descrambler 70, orthogonal transformers 72, blocking switches 80, inverse transformers 82, rescrambler 84, sum-of-squares unit 74, comparison processor 76, and control and sequence unit 78 may be implemented by parallel processing digital logic which may be constructed as a special purpose integrated circuit. However, those skilled in the art will recognize that the present invention may also be practiced using one or more microprocessors having software programs which implement the present invention as described for example with respect to FIGS. 10 and 11.

In the context of mobile radio telephones in cellular systems, different signals originate from different mobile stations located at different distances from a base station. As a result, multiple bursts of codewords relating to one signal are not necessarily time-aligned at the receiver. This disparity in time-alignment may be overcome if after each decoding stage, the residual signals in the composite signal are converted back to a serial stream of samples. Prior to processing a new, next signal, that serial stream of samples is combined with the new signal sample and converted into parallel format using the block timing appropriate to the next signal. These tasks may be performed entirely by appropriate address and data manipulations within a buffer memory included in the digital signal processing block.

A typical propagation path between mobile radio telephones and a base station receiver consists not only of a shortest, line-of-sight path but also a number of delayed paths or echoes due to reflection from mountains, tall buildings, etc. In many dense urban environments, the propagation path may consist only of such echoes. Any direct path, if present, may be too difficult to identify. If the total delay between propagation paths is small compared to the reciprocal bandwidth of the signal, fading results because of the multiple paths adding sometimes constructively and sometimes destructively. However, the signal may be successfully demodulated by assuming that only a single wave exists. On the other hand, a signal having path delays that are large compared with the reciprocal bandwidth (1/bandwidth in hertz) must be treated as having primary and secondary waves. It is usually possible, however, to express the total signal as the sum of a finite number of paths delayed by multiples of the bit period. Each path may be affected by independent amplitude fading and phase rotation due to fractional bit-period delays.

To compensate for this situation, the present invention employs a type of a conventional decoder known as a RAKE receiver to integrate information from multiple bit-period delayed paths. The RAKE receiver correlates the despreading code with the current signal samples as well as the signal samples delayed by one bit period, the signal samples delayed by two bit periods, etc., and combines the correlation results before determining the information content of the signal.

In situations where echoes accompany the direct radio wave, overlapping copies of the composite signal may be received and delayed by one or more bit periods. The reorthogonalization process of the present invention not only removes the energy of these echoes but also employs that echo energy in decoding the composite signal. An excess number of samples greater than N, e.g. dN, is collected in the buffer 68. For example, N may be 128 and dN may be 5. The extra number of samples dN is selected so that dN bit periods span the anticipated range of delayed echoes. The Fast Walsh Transform is performed for dN shifts of the (N+dN) samples in the buffer 68, and the resulting transform components are stored in N individual sum-of-squares registers 74 to determine the index of the component having the largest sum-of-squares. The appropriate blocking switch 80 blocks the largest component; the inverse transform 82 and rescrambler 84 are activated; and the rescrambled output is recirculated to the buffer 68. The buffer 68 contents are shifted backwards, and the subtractive demodulation process is repeated for each of dN shifts. The control and sequence unit 78 determines for each shift whether the echo removal process should be performed. For example, the echo elimination process may be performed only on shifts 1, 3, and 5 because the sequence unit 78 determines that no significant echo energy exists at those shifts. For this process, a noncoherent RAKE decoder may be used with the significant echo shifts being identified by the non-zero RAKE taps.

When echoes corresponding to different shifts of the (N+dN) buffer samples are removed from the composite signal using reorthogonalization, the echo signals are removed preferably in order of signal strength. That echo having the strongest signal strength is removed first with echoes of decreasing strength being removed subsequently. In this way, the influence of stronger echo signals is removed, and weaker information signals which experience interference from strong echoes may be decoded more readily.

Delayed versions of the input signal are processed in the Fast Walsh Transform decoder 72, and the Walsh spectra are added before determining the largest Walsh component. The Walsh spectra may be added either non-coherently, with or without weighting, or coherently with an appropriate relative phase rotation and weighting. In either case, Fast Walsh Transforms are performed on both the real and imaginary vector components of the signal, as described previously, yielding real and imaginary components of the Walsh spectra. In non-coherent addition, only the magnitudes of corresponding complex Walsh spectral components are added and weighted before determining the largest components. In coherent addition, prior knowledge of the relative phase shift between the signal paths is used to phase-align corresponding Walsh components before addition.

Phase-alignment is accomplished by means of a complex multiplication that can simultaneously include an amplitude weighting. If the path phase shift is known by initially transmitting a known signal, for example, that phase shift may be used to rotate corresponding Walsh components until they align on a single axis, and the Walsh component having the largest value on this axis is determined. This technique reduces the effect of non-coherent interference signals by 3 dB, on average, giving a 2:1 extra capacity increase. Moreover, because only that component (real or imaginary) of the complex Walsh spectrum ascribed to the decoded signal is removed after decoding, the correlative loss experienced by other signals is also reduced. For example, the absolute phase shift of the signal paths may be tracked by processing the actual phase shifts of the Walsh components ascribed to the desired signal in a digital phase tracking loop.

In the same way that energy arising on different signal paths may be utilized by combining the results of multiple despreading correlations, the signals arriving on different antennas may be combined to form a diversity receiving system. If an array of antennas is connected to an array of correlating receivers through a beam-forming network, preference may be given in a particular receiver to signals arising from a particular range of directions. For example, in one of a bank of receivers, a signal S1 from a northerly direction may have the greatest signal strength because the antenna beam formed to that receiver points north. In a receiver associated with a southerly pointing beam, the strength of the signal S1 is reduced and a second signal S2 appears greatest. Consequently, the order of demodulation and extraction of signals may differ in two or more receivers and the same signal may be demodulated at a different point in the signal-strength prioritized sequence and with different remaining interference signals present. It is clear that the results of such multiple diversity demodulations can be combined in a variety of ways that will be apparent to those skilled in the art in order to obtain further advantages.

While a particular embodiment of the present invention has been described and illustrated, it should be understood that the invention is not limited thereto since modifications may be made by persons skilled in the art. The present application contemplates any and all modifications that fall within the spirit and scope of the underlying invention disclosed and claimed herein.

What is claimed is:

1. A method for decoding a composite signal having overlapping, coded signals, comprising:
   (a) iteratively correlating said composite signal with a series of codewords and generating for each correlation a plurality of correlation signals;
   (b) extracting a coded signal corresponding to a greatest correlation signal from said composite signal, said greatest correlation having an address associated with one of said correlated code words;
   (c) periodically recorrelating a remaining portion of said composite signal with said codewords; and
   (d) eliminating any correlation signal corresponding to said associated address of at least one codeword previously correlated in step (a) from said remaining composite signal.

2. The method according to claim 1, wherein said correlating step includes a Walsh-Hadamard transformation.

3. The method according to claim 1, wherein said correlating step includes a Fourier transformation.

4. The method according to claim 1, wherein said correlating step includes an orthogonal transformation.

5. The method according to claim 1, wherein said coded signals are complex vectors having real and imaginary components, said real and imaginary components both being correlated in said correlating step (a).

6. The method according to claim 1, wherein said coded signals are extracted based on their relative signal strengths.

7. The method according to claim 1, wherein said at least one codeword corresponds to the coded signal initially extracted in step (b).

8. A system for decoding a composite signal having overlapping, coded signals, comprising:
   means for iteratively performing orthogonal transformations on said composite signal with a series of codeword and generating for each transformation a plurality of transformation components, each transformation component being associated with a codeword and an index;
   means for iteratively extracting the coded signal corresponding to a greatest component from said composite signal;
   means for periodically performing at least one orthogonal transformation on a remaining portion of said composite signal with said codewords; and
   means for eliminating any transformation component corresponding to said associated index of at least one previous codeword.

9. The system according to claim 8, wherein said orthogonal transformations are Walsh-Hadamard transformations.

10. The system according to claim 8, wherein said orthogonal transformations are Fourier transformations.

11. The system according to claim 8, wherein said extracting means extracts said coded signals in an order based on their relative signal strengths.

12. The system according to claim 11, wherein said at least one previous codeword corresponds to the coded signal first extracted by said extracting means.

13. A method for decoding a composite signal having overlapping, coded signals, comprising:
   (a) iteratively performing orthogonal transformations on said composite signal with a plurality of codeword and generating for each transformation a plurality of transformation components, each transformation component having an associated codeword and index;
   (b) iteratively extracting a coded signal corresponding to a greatest transformation component from said composite signal;
   (c) periodically performing at least one orthogonal transformation on a remaining portion of said composite signal using said codewords; and
   (d) eliminating any transformation component corresponding to said associated index of at least one previously extracted coded signal.

14. The method according to claim 13, wherein said performing step (a) includes:
   (e) descrambling said composite signal using a scrambling code associated with the coded signal to be decoded;
   (f) transforming said signal descrambled in step (e) based on said plurality of codewords and generating said plurality of transformation components.

15. The method according to claim 14, wherein said extracting step (b) includes:
   (g) determining a transformation component having the greatest magnitude as the decoded signal;
   (h) removing said decoded signal from said composite signal;
   (i) inversely transforming said remaining components;
   (j) rescrambling said inversely transformed composite signal with said scrambling code used in step (e); and
   (k) selecting a next scrambling code.

16. The method according to claim 15, further comprising:
   (l) ordering said scrambling codes according to a signal strength of each associated coded signal;
   wherein said selecting step (k) includes selecting said next scrambling code based on its relative order.

17. The method according to claim 16, wherein said ordering step (1) includes:
(n) predicting said order based on a recent history of signal strengths of said coded signals.

18. The method according to claim 15, wherein said performing step (c) includes:
(o) descrambling said remaining composite signal using a scrambling code associated with a previously extracted coded signal, and
(p) transforming said descrambled signal in step (o) using said codewords and generating a plurality of transformation components.

19. The method according to claim 18, wherein said eliminating step (d) includes:
(q) setting to zero any transformation component corresponding to said associated index;
(r) inversely transforming the remaining transformation components;
(s) rescrambling said inversely transformed composite signal generated in step (r) with said scrambling code used in step (o).

20. The method according to claim 18, wherein said scrambling code used in step (o) is selected based on relative signal strengths of said coded signals.

21. The method according to claim 20, wherein said scrambling code in step (o) is the scrambling code associated with the coded signal having greatest signal strength.

22. The method according to claim 15, further comprising:
(t) collecting a number of samples of said composite signal;
(u) algebraically combining said samples;
(v) dividing the combination resulting from step (u) by the number of samples combined to produce a quotient; and
(w) algebraically combining said quotient with said samples using the combining process followed in step (u).

23. A system for decoding a composite signal having overlapping, coded signals, comprising:
plural signal extraction stages, each stage having means for receiving said composite signal and a series of codewords and means for extracting from said composite signal a coded signal associated with one of said codewords, and
at least one signal elimination stage having means for eliminating from a remaining portion of said composite signal a residual signal associated with one of said coded signals previously extracted by said extracting means.

24. The system according to claim 23, wherein said elimination stage includes plural elimination stages, each elimination stage eliminating residual signals associated with different ones of said coded signals previously extracted.

25. The system according to claim 23, wherein each signal extraction stage further comprises:
first means for descrambling said composite signal using a scrambling code associated with the coded signal to be decoded;
first means for transforming said descrambled signal and generating a plurality of transformation components each component having an associated codeword; and
first means for transmitting a remaining portion of said composite signal to a next extraction stage.

26. The system according to claim 25, wherein said extracting means includes:
means for determining a transformation component having a greatest magnitude as a decoded signal;
means for removing said decoded signal;
first means for inversely transforming remaining transformation components; and
first means for rescrambling said inversely transformed signals to generate said remaining composite signal using said associated scrambling code.

27. The system according to claim 26, wherein said elimination stage includes:
second means for descrambling said remaining composite signal using a previous scrambling code associated with a coded signal previously extracted in a prior extraction stage;
second means for transforming said descrambled signal received from said second descrambling means based on said codewords and generating a plurality of second transformation components,
means for setting to zero any second transformation component signal corresponding to a codeword associated with said previously extracted signal;
second means for inversely transforming remaining transformation components;
second means for rescrambling signals received from said second inverse transform means to generate said remaining composite signal; and
means for transmitting said rescrambled composite signal to a next signal extraction stage.

28. The system according to claim 27, wherein said scrambling codes are selected based on a signal strength of the associated coded signal relative to signal strengths of all coded signals in said composite signal.

29. The system according to claim 28, wherein said scrambling code associated with a previously decoded signal having a greatest signal strength is selected by said second descrambling means.

30. The system according to claim 23, wherein each signal extraction stage sequentially extracts coded signals in an order based on relative signal strength such that a first extraction stage extracts a strongest coded signal.

31. A method for decoding a composite signal having overlapped, coded signals and time-delayed echoes of at least some of said coded signals, comprising:
(a) correlating a series of codewords with a plurality of time-shifted versions of said composite signal and generating a set of correlations for each time-shifted composite signal;
(b) combining all of said sets of correlations for said time-shifted composite signals to produce a combined set of correlations;
(c) determining a codeword corresponding to a greatest correlation in said combined set; and
(d) subtracting said determined codeword from at least one of said time-shifted composite signals.

32. A method according to claim 31, wherein said combining step (b) includes adding squared magnitudes of corresponding values from each correlation set.

33. A method according to claim 31, wherein said combining step (b) includes weighting and adding corresponding values from each correlation set using a complex weighting factor associated with each time-shifted composite signal.

34. A method according to claim 31, wherein said correlating step (a) is performed using Walsh-Hadamard Transformations.

35. A method according to claim 34, wherein said subtracting step (d) includes setting to zero a component of said Walsh-Hadamard Transformation and further includes performing an inverse Walsh-Hadamard Transformation.

36. A method according to claim 31, wherein said subtracting step (d) is performed on each time-shifted composite signal in an order depending on their respective signal strengths.

37. A method according to claim 36, wherein said order is a descending order of magnitude of the correlation in each of said sets of correlations corresponding to said codeword determined in step (c).

38. A method according to claim 37, wherein a set of correlations corresponding to a time-shifted composite signal exhibiting a lower correlation magnitude is re-computed after said subtracting step (d) is completed on a time-shifted composite signal exhibiting a higher correlation magnitude.

39. A method according to claim 35, wherein before said correlating step (a) said composite signal is descrambled with a scrambling code corresponding to a signal to be decoded.

40. A method according to claim 39, wherein said inverse transformed signal is rescrambled using said scrambling code.

* * * * *